(12) United States Patent
Tomatsu et al.

(10) Patent No.: US 8,144,244 B2
(45) Date of Patent: Mar. 27, 2012

(54) IMAGING DEVICE

(75) Inventors: Kei Tomatsu, Hyogo (JP); Masato Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 12/466,842

(22) Filed: May 15, 2009

(65) Prior Publication Data

US 2009/0316037 A1 Dec. 24, 2009

(30) Foreign Application Priority Data

Jun. 18, 2008 (JP) .................................. 2008-158581

(51) Int. Cl.
*H04N 5/225* (2006.01)
*G03B 13/00* (2006.01)

(52) U.S. Cl. .................... 348/375; 348/373; 348/345

(58) Field of Classification Search ........... 348/373–375
See application file for complete search history.

(56) References Cited

U.S. PATENT DOCUMENTS

| | | | | |
|---|---|---|---|---|
| 4,456,356 A | * | 6/1984 | Okabe | 396/103 |
| 4,890,132 A | * | 12/1989 | Hama | 396/79 |
| 5,654,833 A | * | 8/1997 | Fujike et al. | 359/822 |
| 6,349,172 B1 | * | 2/2002 | Tanaka et al. | 396/61 |

FOREIGN PATENT DOCUMENTS

| | | |
|---|---|---|
| JP | 4-307505 | 10/1992 |
| JP | 4-340908 | 11/1992 |
| JP | 7-140533 | 6/1995 |
| JP | 8-298675 | 11/1996 |
| JP | 2000-338587 | 12/2000 |
| JP | 2003-46818 | 2/2003 |
| JP | 2007-322985 | 12/2007 |

\* cited by examiner

*Primary Examiner* — Jordan Schwartz
(74) *Attorney, Agent, or Firm* — Oblon, Spivak, McClelland, Maier & Neustadt, L.L.P.

(57) ABSTRACT

Disclosed herein is an imaging device including: a body portion; a lens mount portion provided on the body portion for mounting a detachable taking lens; a body-side coupler provided in the body portion and adapted to be connected to a lens-side coupler of the taking lens in mounting the taking lens to the lens mount portion, the body-side coupler being rotated in concert with a moving operation of a focus lens provided in the taking lens; and load applying section configured to apply a braking load to the body-side coupler.

6 Claims, 13 Drawing Sheets

IMAGING DEVICE

BACKGROUND OF THE INVENTION

1. Field of the Invention

Embodiments of the present invention relate to an imaging device such as a digital camera, and more particularly to a lens interchangeable type imaging device.

2. Description of the Related Art

In a lens interchangeable single-lens reflex type camera, a drive source (e.g., AF motor, AF stands for autofocus) for a focus lens is provided in a camera body, so that no drive source (AF drive source) for the focus lens is provided in a taking lens. In such a taking lens (AF drive source uncontaining type lens), a driving force from the AF drive source provided in the camera body is transmitted through a coupler (more specifically, a body-side coupler and a lens-side coupler) to the focus lens. Thus, the driving force from the camera body side is transmitted to the taking lens side, thereby automatically driving the focus lens in the taking lens (see Japanese Patent Laid-Open No. 2007-322985, for example).

In a relatively new taking lens, an AF drive source is often provided in a taking lens (AF drive source containing type lens).

Such an AF drive source containing type lens is adapted to be mounted to a camera body, so that no AF drive source is often provided in the camera body. Accordingly, the camera body can be reduced in weight, and a cost reduction can therefore be realized.

SUMMARY OF THE INVENTION

In a lens interchangeable type imaging device (e.g., single-lens reflex type camera), various combinations of a taking lens and a camera body can be expected.

As one expected case, an AF drive source uncontaining type lens (in short, a relatively old lens) is mounted to a camera body having no AF drive source (in short, a relatively new camera body). In this case, autofocus driving cannot be performed because no AF drive source is provided in the camera body. However, a manual focus operation such that a focus lens is manually moved can be performed in taking a picture.

However, in the case that the AF drive source uncontaining type lens is mounted to the camera body having no AF drive source to perform the manual focus operation, a lens-side coupler of the uncontaining type lens is not connected to any AF drive source. Further, it is assumed that the camera body having no AF drive source is used in combination with an AF drive source containing type lens, so that the camera body usually excludes a coupler (body-side coupler) for transmitting a driving force.

In this case, almost no load is applied to the lens-side coupler. Accordingly, the focus lens may be relatively largely moved by applying a very small force. For example, the position of the focus lens may be largely changed by a light touch on a focus ring for manual focus adjustment in the taking lens. Thus, fine adjustment for the focus lens becomes difficult.

Accordingly, it is desirable to improve the operability in a manual focus operation.

Further, the improvement in operability in a manual focus operation is desirable in the case of using a camera body having an AF drive source as well as in the case of using a camera body having no AF drive source.

It is accordingly desirable to provide an imaging device which can improve the operability in a manual focus operation.

In accordance with an embodiment of the present invention, there is provided an imaging device including a body portion; a lens mount portion provided on the body portion for mounting a detachable taking lens; a body-side coupler provided in the body portion and adapted to be connected to a lens-side coupler of the taking lens in mounting the taking lens to the lens mount portion, the body-side coupler being rotated in concert with a moving operation of a focus lens provided in the taking lens; and load applying means for applying a braking load to the body-side coupler.

With this arrangement, the operability in a manual focus operation can be improved.

Other features of the invention will be more fully understood from the following detailed description and appended claims when taken with the accompanying drawings.

DETAILED DESCRIPTION OF THE PREFERRED EMBODIMENTS

Some preferred embodiments of the present invention will now be described with reference to the drawings.

1. First Preferred Embodiment

Figure 1:
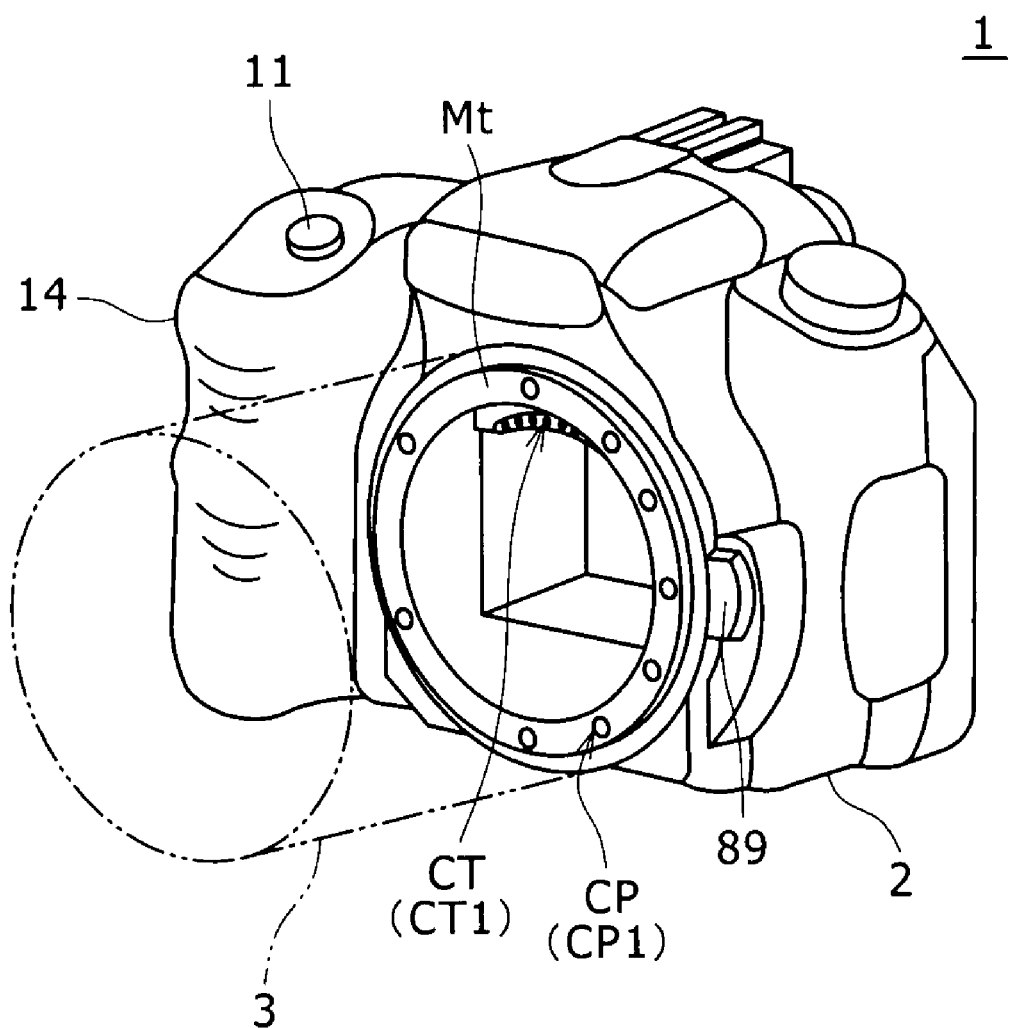
FIG. 1 is a perspective view showing the external configuration of an imaging device (camera body) according to a first preferred embodiment of the present invention.

FIG. 1 is a perspective view showing the external configuration of an imaging device 1 (1A) according to a first preferred embodiment of the present invention. The imaging device 1 is configured as a lens interchangeable single-lens reflex type digital camera.

As shown in FIG. 1, the imaging device 1A is provided with a camera body 2 (2A). An interchangeable (detachable) taking lens unit (interchangeable lens) 3 is detachably mounted to the camera body 2. While the taking lens unit 3 is in a demounted condition with respect to the camera body 2 in FIG. 1, an actual taking operation is performed in the condition where the taking lens unit 3 is mounted on the camera body 2.

An annular mount portion Mt for mounting the taking lens unit 3 is formed on the front surface of the camera body 2 at a substantially central position thereof, and a lens release button 89 for use in interchanging the taking lens unit 3 is provided near the annular mount portion Mt.

The taking lens unit 3 includes a lens barrel, a lens group 37 (see FIG. 2) provided in the lens barrel, a diaphragm, and the like. The lens group 37 (taking optical system) includes a focus lens adapted to be moved along its optical axis, thereby changing a focal position.

As described above, various taking lens units (which will be hereinafter referred to also simply as taking lenses) 3 are selectively mountable to the camera body 2. More specifically, a taking lens containing an AF drive source (e.g., AF motor) for driving the focus lens is mountable to the camera body 2. This taking lens containing the AF drive source will be hereinafter referred to as "AF drive source containing type lens" or simply as "containing type lens." Further, a taking lens not containing the AF drive source is also mountable to the camera body 2. This taking lens not containing the AF drive source will be hereinafter referred to as "AF drive source uncontaining type lens" or simply as "uncontaining type lens."

Further, a grip portion 14 adapted to be gripped by an operator is formed on the front surface of the camera body 2 at a left end portion thereof. Further, a shutter release button 11 for directing the start of exposure is provided on the upper surface of the grip portion 14. A battery storing chamber and a card storing chamber are defined in the grip portion 14. A battery such as a lithium ion battery is stored as a power source for the camera in the battery storing chamber, and a memory card 90 (see FIG. 2) for recording image data on an image formed by the taking lens unit 3 is removably stored into the card storing chamber.

The shutter release button 11 is a two-stage detectable button capable of detecting two different conditions, i.e., a half-depressed condition S1 and a full-depressed condition S2. The shutter release button 11 received a taking standby direction DR1 and a taking start direction DR2 according to the result of detection of these conditions S1 and S2.

When the shutter release button 11 is half depressed to make the half-depressed condition S1, the imaging device 1 determines that the taking standby direction (or exposure standby direction) DR1 has been given by the operator. Then, the imaging device 1 performs a standby operation (e.g., AF control operation and AE control operation) for obtaining a still image (present taken picture) to be recorded in relation to a subject in response to the above-mentioned taking standby direction DR1.

When the shutter release button 11 is further depressed to make the full-depressed condition S2, the imaging device 1 determines that the taking start direction (or exposure start direction) DR2 has been given by the operator. Then, the imaging device 1 performs a picture taking operation (i.e., a series of operations including an exposure operation on a subject image (optical image of the subject) by using an image sensor 5 to be hereinafter described and an image processing operation for applying predetermined image processing to an image signal obtained by the above exposure operation).

Figure 2:
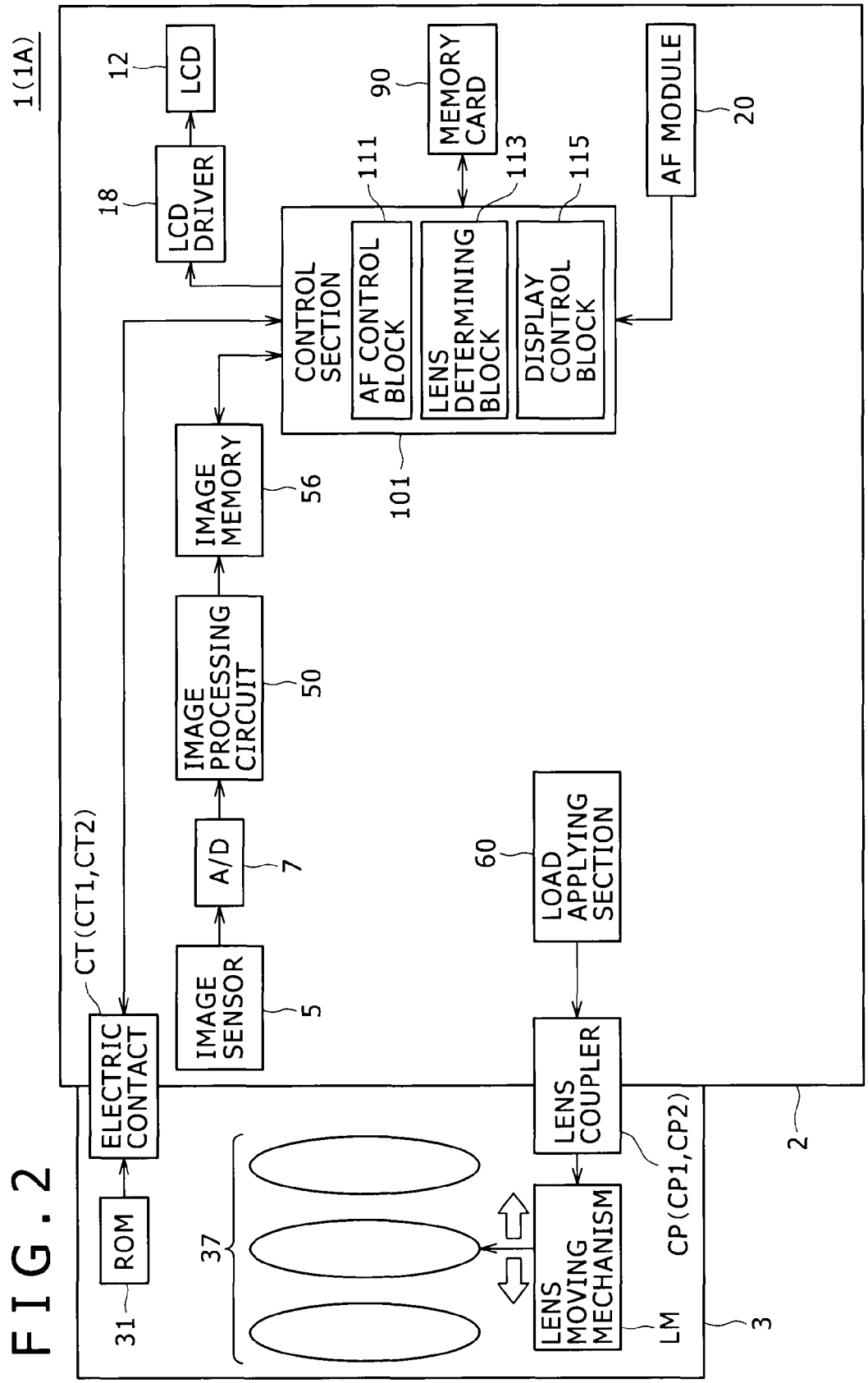
FIG. 2 is a block diagram showing the functional configuration of the imaging device according to the first preferred embodiment.

The outline of the function of the imaging device 1 will now be described with reference to FIG. 2. FIG. 2 is a block diagram showing the functional configuration of the imaging device 1.

As shown in FIG. 2, the camera body 2 of the imaging device 1 includes an image sensor 5, A/D converter circuit 7, digital signal processing circuit 50, image memory 56, LCD (liquid crystal display) driver 18, back monitor (LCD) 12, AF module 20, and general control section 101.

The image sensor (e.g., CCD (charge coupled device) sensor) 5 is a photodetector for converting an optical image of a subject (subject image) formed by the taking lens unit 3 into an electrical signal by photoelectric conversion. That is, the image sensor 5 generates an image signal relating to the present taken picture (image signal to be recorded). In other words, the image sensor 5 can be represented as an image sensor for obtaining an image to be recorded.

In response to a drive control signal (accumulation start signal and accumulation end signal) from the general control section 101, the image sensor 5 performs the exposure of a subject image formed on a photodetecting surface (i.e., the accumulation of charge by photoelectric conversion), thereby generating an image signal relating to this subject image.

The image signal obtained by the image sensor 5 is converted into digital image data (image data) by the A/D converter circuit 7. This image data is input into the digital signal processing circuit 50.

The digital signal processing circuit 50 performs digital signal processing for the image data input from the A/D converter circuit 7, thereby generating image data relating to the present taken picture. The digital signal processing circuit 50 includes a black level correcting circuit, white balance (WB) circuit, and gamma correcting circuit, thereby performing various digital image processings. The image signal (image data) processed by the digital signal processing circuit 50 is stored into the image memory 56. The image memory 56 is a high-speed accessible image memory for temporarily storing the image data generated, and has a storage capacity for image data corresponding to a plurality of frames.

In taking a picture through the taking lens unit 3, the image data temporarily stored into the image memory 56 is suitably subjected to image processing (e.g., compression processing) in the general control section 101, and is thereafter stored into the memory card 90.

The image temporarily stored in the image memory 56 is displayed on the back monitor 12 under the control of a display control block 115 (which will be hereinafter described) in the general control section 101. Accordingly, it is possible to realize confirmation display (afterview display) for displaying an afterview image as a confirmation image relating to the present picture taking according to a picture taking direction. It is also possible to realize reproduction display for reproducing a picture already taken by this imaging device. The display operation of the back monitor 12 is controlled by the display control block 115 and the LCD driver 18.

The AF module 20 can detect a focused condition of a subject by a suitable focused condition detecting method such as a phase difference detecting method using the incident light passing through the taking lens unit 3 through a mirror mechanism. Thus, by using the phase difference type AF module 20, a focus lens position can be obtained very quickly.

The general control section 101 is configured as a microcomputer, and it mainly includes a CPU (central processing unit), memory, and ROM (read only memory) (e.g., EEPROM (electrically erasable and programmable read only memory)). The CPU in the general control section 101 reads out a program stored in the ROM and executes this program to thereby realize various functions.

The general control section 101 includes an AF control block 111, lens determining block 113, and display control block 115.

The lens determining block 113 performs communication through an electric contact CT (more specifically, a body-side electric contact CT1 and a lens-side electric contact CT2) to a ROM 31 provided in the taking lens unit 3, thereby receiving lens identification information (e.g., lens number) on the taking lens unit 3 currently mounted on the camera body 2, for example. The lens determining block 113 can determine the kind of the taking lens unit 3 according to the lens identification information received above.

The AF control section (focus control section) 111 realizes focus control by using focusing information on an AF area as an object to be focused. As the focusing information, the focus lens position detected by the AF module 20 is used, for example.

In the imaging device 1A, whether or not an AF operation can be performed depends on the kind of the taking lens unit 3 currently mounted.

In the imaging device 1A, in the case that an AF drive source containing type lens is mounted as the taking lens unit 3 on the camera body 2, the AF operation can be performed. More specifically, a control signal from the AF control block 111 is transmitted through the electric contact CT to a lens driving section (not shown) provided in the taking lens unit 3, thereby driving the AF drive source (e.g., AF motor) provided in the taking lens unit 3. In response to this driving operation, the focus lens provided in the taking lens unit 3 is moved to a focusing position along its optical axis to thereby realize a focusing operation.

In the imaging device 1A, in the case that an AF drive source uncontaining type lens is mounted as the taking lens unit 3 on the camera body 2, on the other hand, the AF operation cannot be performed because no AF drive source is provided in the camera body 2 of the imaging device 1.

However, as described above, in the case that an AF drive source uncontaining type lens is mounted as the taking lens unit 3 on the camera body 2, a picture taking operation by manual focusing can be performed.

However, in the case of mounting an uncontaining type lens on the camera body 2 having no AF drive source, there arises a problem as mentioned above in the related art. More specifically, in the case of mounting an uncontaining type lens, almost no load is applied to a coupler CP (more specifically, a lens-side coupler CP2) (see FIG. 3). Accordingly, there is a possibility that the focus lens may be relatively largely moved by applying a very small force, thus causing an unstable operation of the focus lens. As a result, fine adjustment in relation to the focus lens becomes difficult. In particular, in the case that the taking lens unit 3 has a relatively heavy lens, there is a possibility that the focus lens may be easily moved by its own weight when the camera is inclined downward.

To cope with this problem, the camera body 2 includes a load applying section 60 for applying a braking load to the rotational operation of the coupler CP (more specifically, a body-side coupler CP1) according to this preferred embodiment.

Figure 3:
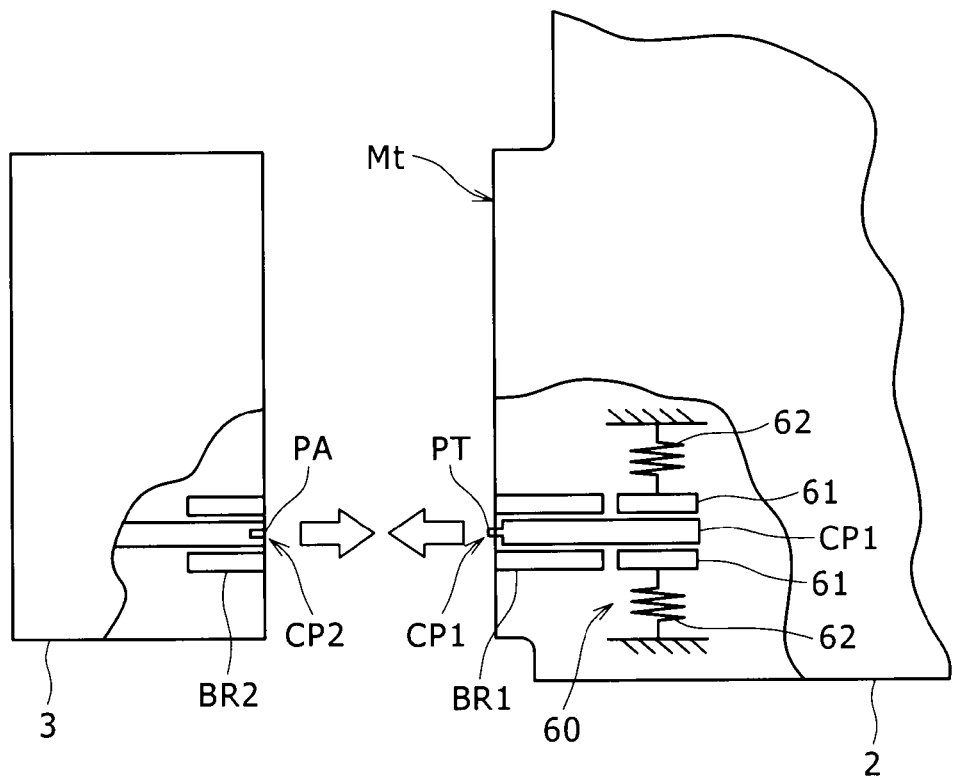
FIG. 3 is a diagrammatic view showing a condition where an uncontaining type lens is mounted to the camera body.

FIG. 3 shows a condition where an uncontaining type lens is mounted as the taking lens unit 3 to the camera body 2.

Figure 4:
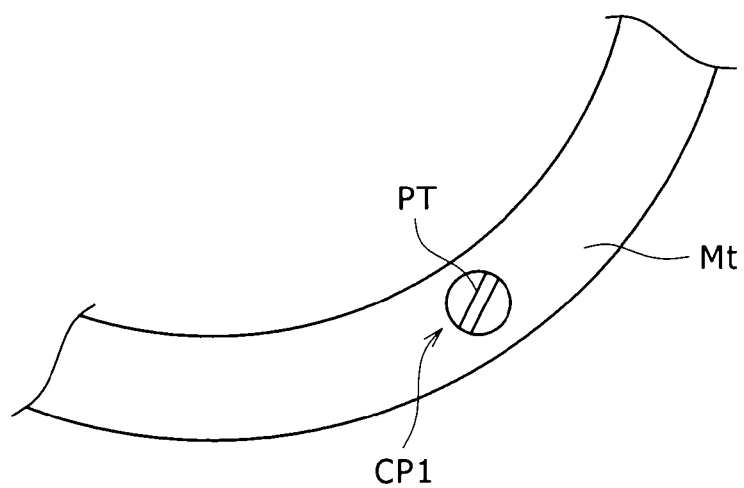
FIG. 4 is an enlarged front view of the body-side coupler and its peripheral portion.

As shown in FIG. 3, the uncontaining type lens is provided with a lens-side coupler CP2 as a part of the coupler CP. On the other hand, the camera body 2 is provided with a body-side coupler CP1 as a part of the coupler CP. The body-side coupler CP1 and the lens-side coupler CP2 are rotatably supported to bearing members BR1 and BR2, respectively. More specifically, as shown in FIG. 4 which is an enlarged view, the cylindrical body-side coupler CP1 is provided at the annular mount portion Mt in such a manner that one end surface of the coupler CP1 is exposed to the front surface of the mount portion Mt. This one end surface of the coupler CP1 is formed with a projection PT. On the other hand, the lens-side coupler CP2 is formed with a recess PA (see FIG. 3) for engaging the projection PT of the body-side coupler CP1. Accordingly, in mounting the taking lens unit 3 to the mount portion Mt of the camera body 2, the projection PT of the body-side coupler CP1 of the imaging device 1 is engaged with the recess PA of the lens-side coupler CP2 provided at the corresponding position to the body-side coupler CP1. As a result, the body-side coupler CP1 and the lens-side coupler CP2 are connected together and they are rotatable together. The body-side coupler CP1 is connected through the lens-side coupler CP2 to a focus lens moving mechanism LM (see FIG. 2) provided in the taking lens unit 3. As a result, the body-side coupler CP1 and the lens-side coupler CP2 are rotated in concert with the moving operation of the focus lens moved by the moving mechanism LM.

Further, the camera body 2 includes the load applying section 60 for applying a braking load to the rotational operation of the body-side coupler CP1.

Figure 5:
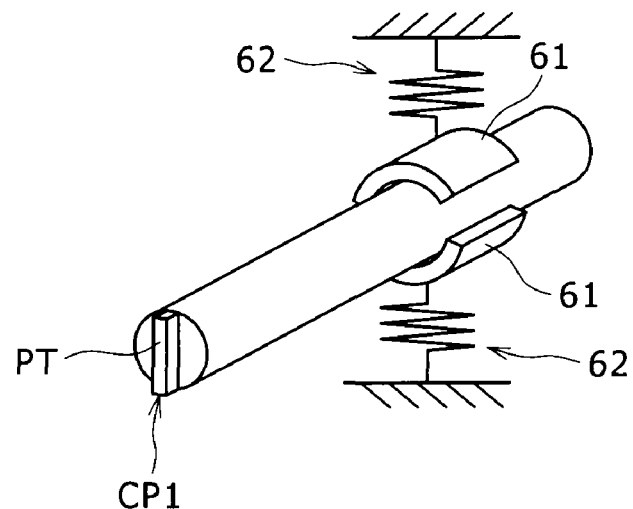
FIG. 5 is a perspective view of the body-side coupler and a load applying section.

As shown in FIGS. 3 and 5, the load applying section 60 includes a pair of braking pads 61 provided around the cylindrical outer surface of the body-side coupler CP1 and a pair of elastic force applying springs 62 for respectively applying forces (elastic forces) of biasing the braking pads 61 toward the body-side coupler CP1. Each elastic force applying spring 62 is provided under a compressed condition between the corresponding braking pad (braking member) 61 and a fixed member fixed to the camera body 2. Accordingly, each braking pad 61 is in contact with the body-side coupler CP1 in the condition where a suitable biasing force is applied to the braking pad 61. As a result, when the body-side coupler CP1 is rotated, a braking force (frictional force) is applied from each braking pad 61 to the body-side coupler CP1.

Such a braking force is transmitted from each braking pad 61 to the body-side coupler CP1 and further transmitted through the lens-side coupler CP2 to the focus lens moving mechanism LM provided in the taking lens unit 3. Accordingly, a suitable braking load is applied in moving the focus lens provided in the taking lens unit 3. It is therefore possible to avoid the problem that the focus lens may be relatively largely moved by applying a very small force to the focus lens, so that fine adjustment in relation to the focus lens can be performed.

For example, when the operator rotates a manual focus ring provided in the taking lens unit 3, a suitable braking force (braking load) is applied through the body-side coupler CP1 and the lens-side coupler CP2 to the focus lens moving mechanism LM, thereby braking the movement of the focus lens along its optical axis. Accordingly, fine focus adjustment for the focus lens can be performed.

Further, in a rest condition of the camera, a braking force (especially, a static frictional force) by the load applying section 60 is kept applied through the body-side coupler CP1 and the lens-side coupler CP2 to the focus lens, thereby suppressing the movement of the focus lens. Accordingly, in the case that the taking lens unit 3 has a relatively heavy lens, it is possible to prevent the movement of the focus lens due to its own weight (due to the action of gravity).

Thus, the operability in the manual focus operation can be improved.

Figure 6:
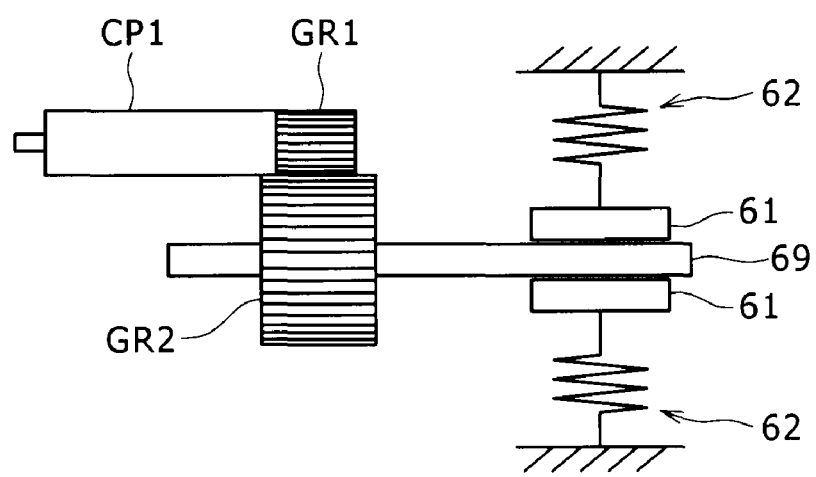
FIG. 6 is a diagrammatic view showing a modification of the first preferred embodiment.

While a braking load is directly applied to the body-side coupler CP1 in the first preferred embodiment, the present invention is not limited to this configuration. For example, a braking load may be indirectly applied to the body-side coupler CP1 as shown in FIG. 6. FIG. 6 shows such a modification. Referring to FIG. 6, a gear GR1 is formed at a rear end portion (right end portion as viewed in FIG. 6) of a rotating shaft forming the body-side coupler CP1, and another gear GR2 meshing with the gear GR1 is provided on a rotating shaft 69. The braking pads 61 are in contact with the rotating shaft 69 to thereby apply a braking load through the rotating shaft 69 and the gears GR1 and GR2 to the body-side coupler CP1. In this manner, a braking load can be applied indirectly to the body-side coupler CP1 according to this modification.

2. Second Preferred Embodiment

The second preferred embodiment is a modification of the first preferred embodiment. The difference between the first preferred embodiment and the second preferred embodiment will now be described mainly.

Figure 7:
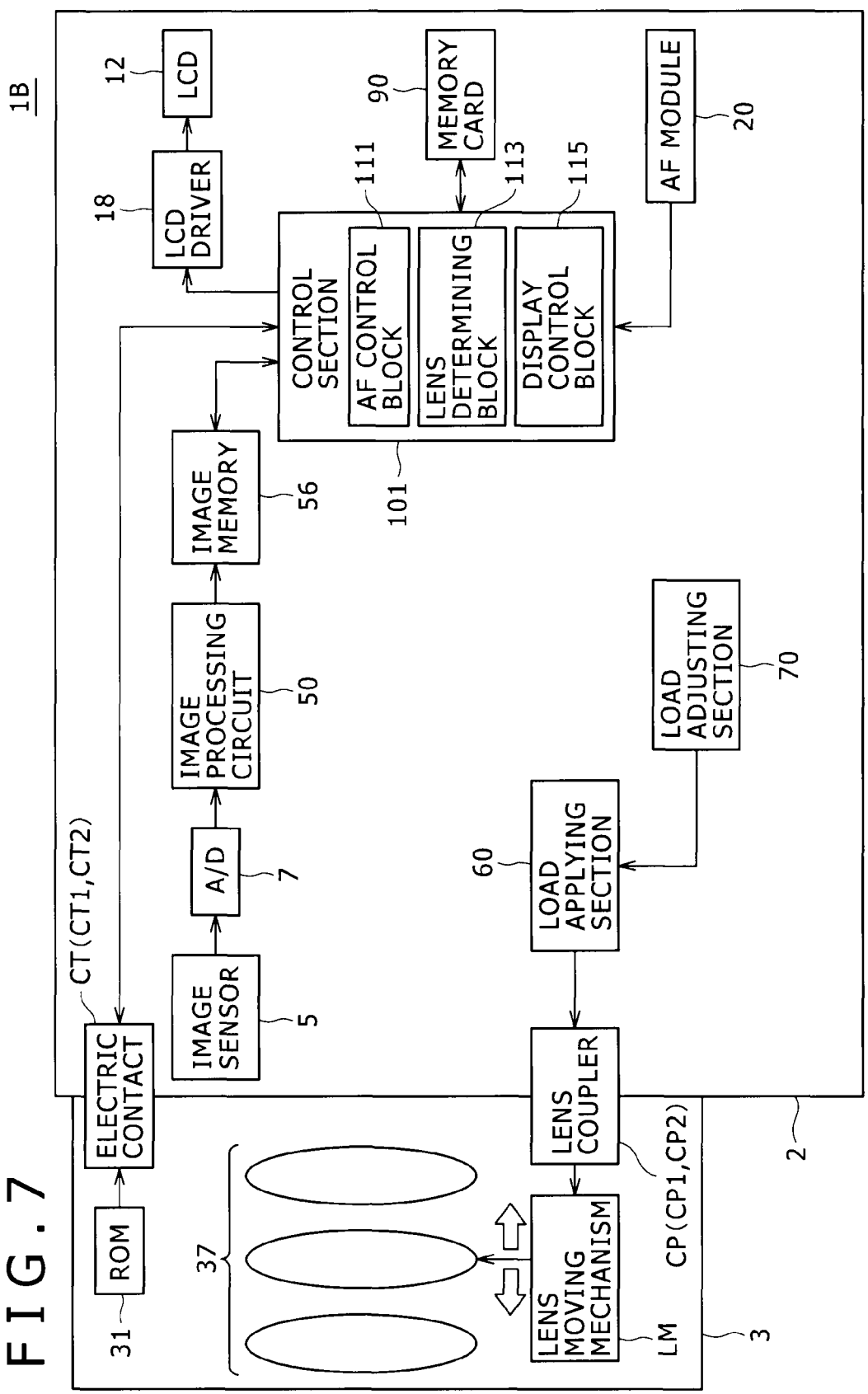
FIG. 7 is a block diagram showing the functional configuration of an imaging device according to a second preferred embodiment of the present invention.

FIG. 7 is a block diagram showing the functional configuration of an imaging device 1B according to the second preferred embodiment. As shown in FIG. 7, the imaging device 1B further includes a load adjusting section 70 in addition to the configuration of the imaging device 1A according to the first preferred embodiment.

Figure 8:
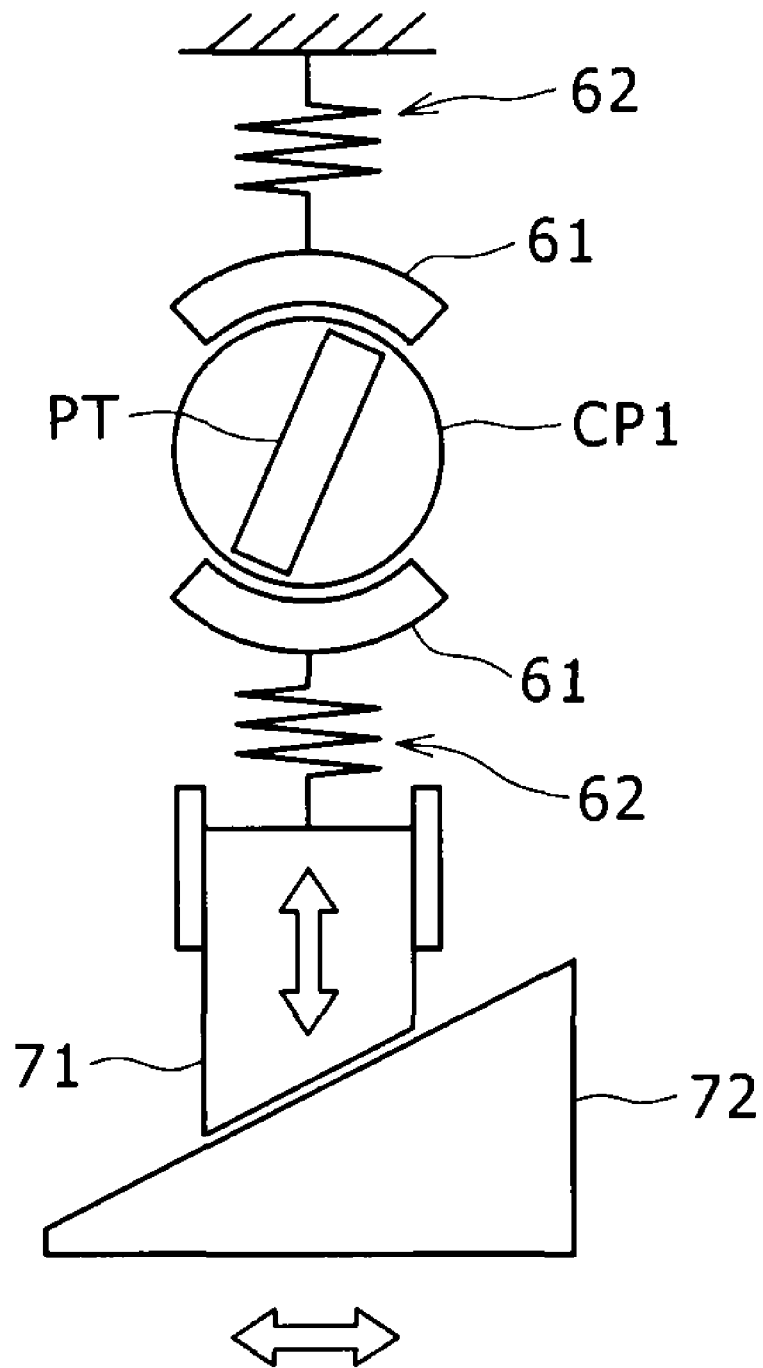
FIG. 8 is a diagrammatic view showing a load applying section and a load adjusting section in the imaging device shown in FIG. 7.

FIG. 8 is a schematic view showing the configuration of the load applying section 60 and the load adjusting section 70 shown in FIG. 7. As shown in FIG. 8, the load applying section 60 in the imaging device 1B according to the second preferred embodiment is similar to that in the imaging device 1A according to the first preferred embodiment. That is, the load applying section 60 shown in FIG. 8 includes a pair of braking pads 61 and a pair of elastic force applying springs 62.

However, in the imaging device 1B, the biasing force of the elastic force applying spring 62 to one of the braking pads 61 can be adjusted by the load adjusting section 70.

More specifically, the load adjusting section 70 is provided with a load adjusting mechanism including a first slider 71 and a second slider 72. The first slider 71 and the second slider 72 are adapted to slide in about 90 degrees different directions.

The first slider 71 is connected through the elastic force applying spring 62 to one of the braking pads 61. Each elastic force applying spring 62 is provided in its compressed condition. Accordingly, each braking pad 61 is in contact with the body-side coupler CP1 in the condition where a suitable biasing force is applied.

The first slider 71 and the second slider 72 have inclined surfaces kept in contact with each other so that the directions of movement of the first and second sliders 71 and 72 become different by about 90 degrees. More specifically, the lower end surface of the first slider 71 is formed as an inclined surface inclined with respect to the direction (vertical direction) of movement of the first slider 71. On the other hand, the upper surface of the second slider 72 is formed as an inclined surface inclined with respect to the direction of movement of the first slider 71. The angle of inclination of the inclined surface of the second slider 72 is the same as that of the inclined surface of the first slider 71. Further, the lower end surface (inclined surface) of the first slider 71 is in contact with the upper surface (inclined surface) of the second slider 72. Further, the upper surface of the second slider 72 ranges wider than the lower end surface of the first slider 71 in the direction (horizontal direction) of movement of the second slider 72. Accordingly, when the second slider 72 is moved in the horizontal direction, the horizontal displacement of the second slider 72 is converted into the vertical displacement of the first slider 71 by the inclined surfaces of the first and second sliders 71 and 72 having a direction converting function.

Further, a part of the second slider 72 is exposed to the outer surface of the camera body 2 and adapted to be moved by an operational force from the operator. Accordingly, when the operator applies an operational force to the second slider 72 to move the second slider 72, the vertical position of the first slider 71 (the position in the direction of application of the biasing force) is changed according to the movement of the second slider 72. For example, when the second slider 72 is moved rightward as viewed in FIG. 8, the first slider 71 is moved downward to thereby reduce the biasing force. Conversely, when the second slider 72 is moved leftward as viewed in FIG. 8, the first slider 71 is moved upward to thereby increase the biasing force. Thus, the load adjusting section 70 can adjust the magnitude of the braking load by the load applying section 60. Further, a part of the lower surface of the second slider 72 is in contact with the inner surface of the camera body 2, and a relatively large frictional force is produced between the contact surfaces of the second slider 72 and the camera body 2. Accordingly, even after the operational force by the operator is removed from the second slider 72, the second slider 72 can be kept at its operated position.

According to such an adjusting operation (manual adjusting operation), the operation feel of the manual focus ring in the manual focus operation can be adjusted more properly. In particular, the braking force to the manual focus ring can be adjusted according to the preferences of the user. In other words, the operation feel of the manual focus ring can be changed according to the preferences of the user. Accordingly, the operability by the user can be further improved.

3. Third Preferred Embodiment

The third preferred embodiment is a modification of the second preferred embodiment. The difference between the second preferred embodiment and the third preferred embodiment will now be described mainly.

Figure 9:
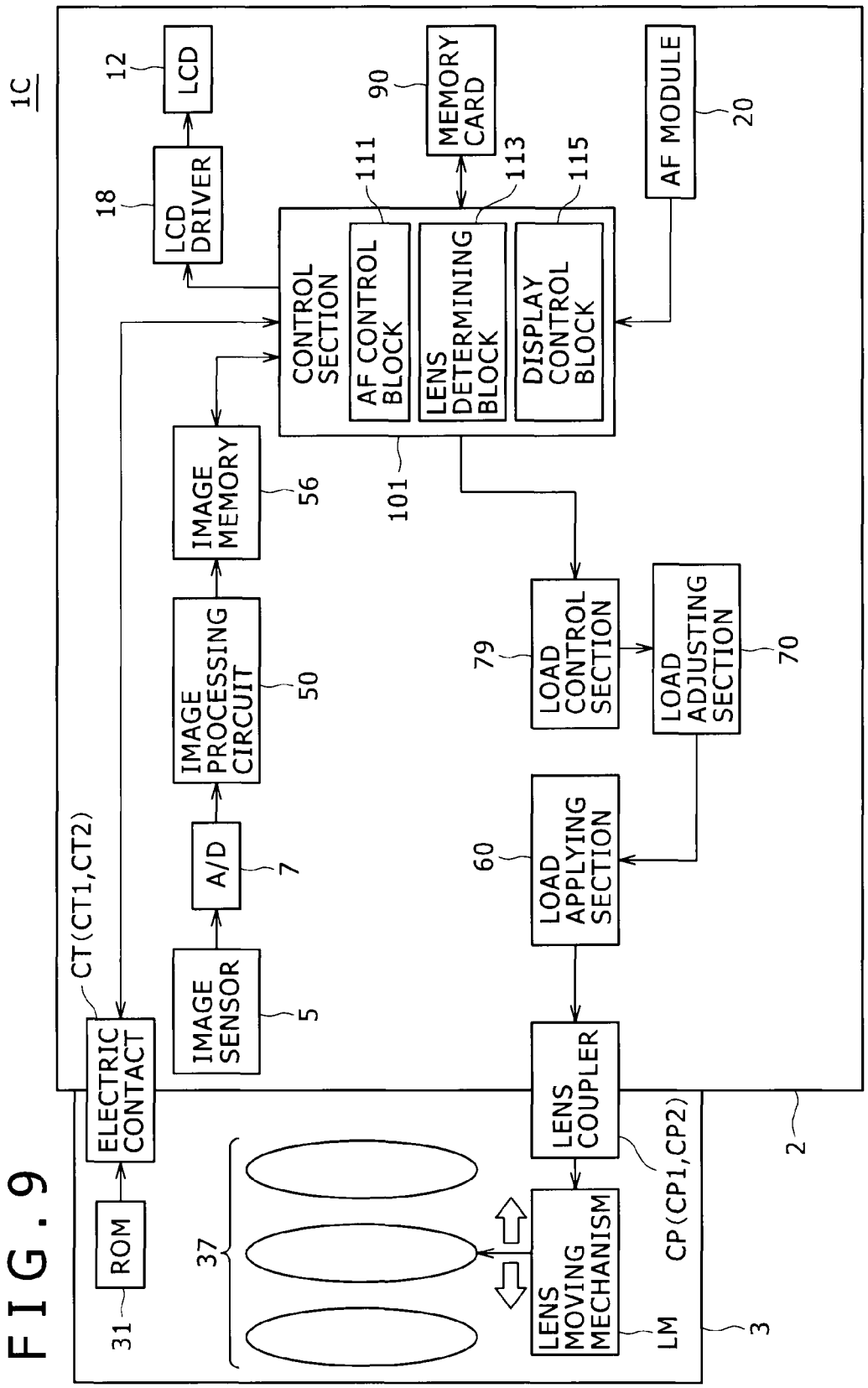
FIG. 9 is a block diagram showing the functional configuration of an imaging device according to a third preferred embodiment of the present invention.
Figure 10:
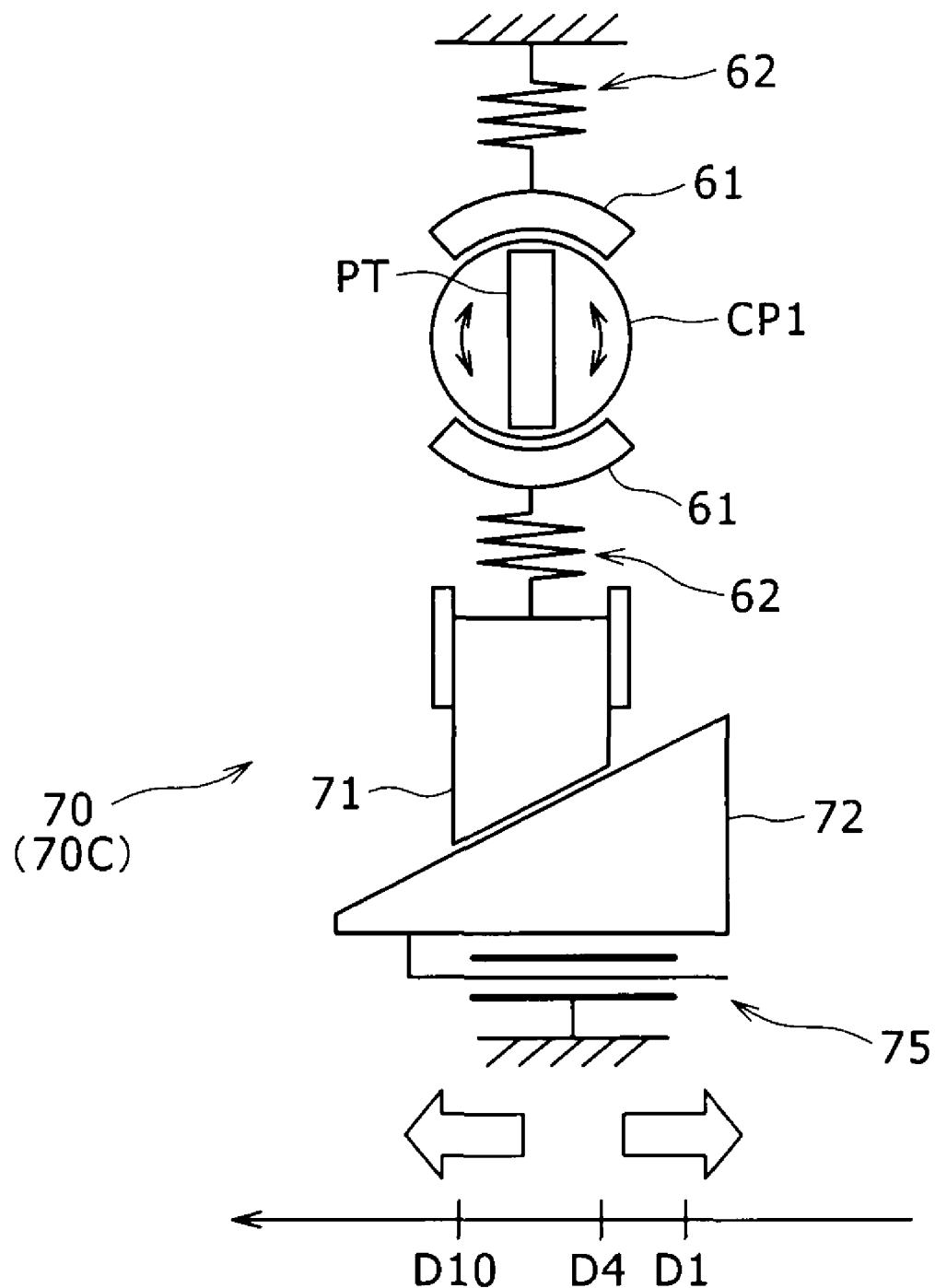
FIG. 10 is a diagrammatic view showing a load applying section and a load adjusting section in the imaging device shown in FIG. 9.

FIG. 9 is a block diagram showing the functional configuration of an imaging device 1C according to the third preferred embodiment. As shown in FIG. 9, the imaging device 1C further includes a load control section 79 in addition to the configuration of the imaging device 1B according to the second preferred embodiment. Further, as shown in FIG. 10, the load adjusting section 70 (70C) of the imaging device 1C has a driving block 75 for driving the load adjusting mechanism (inclusive of the second slider 72) of the load adjusting section 70. FIG. 10 is a schematic view showing the configuration of the load applying section 60 and the load adjusting section 70 (70C) shown in FIG. 9.

The load adjusting section 70C can change the magnitude of a braking load through the driving block 75. The driving block 75 may be provided by various drive sources such as a linear motor. More specifically, the second slider 72 is driven in the horizontal direction by the driving block 75, thereby automatically adjusting the operation feel of the manual focus ring in the manual focus operation. In other words, according to the third preferred embodiment, the magnitude of the braking load by the load applying section 60 can be electrically adjusted by the driving block 75.

The magnitude of the braking load is changed according to the kind of the taking lens unit 3 determined by the lens determining block 113. More specifically, the driving block 75 changes the position of the second slider 72 according to the kind of the taking lens mounted on the mount portion Mt. As a result, the position of the first slider 71 is changed. Such a control operation in relation to load adjustment is performed by the load control section 79.

Figure 11:
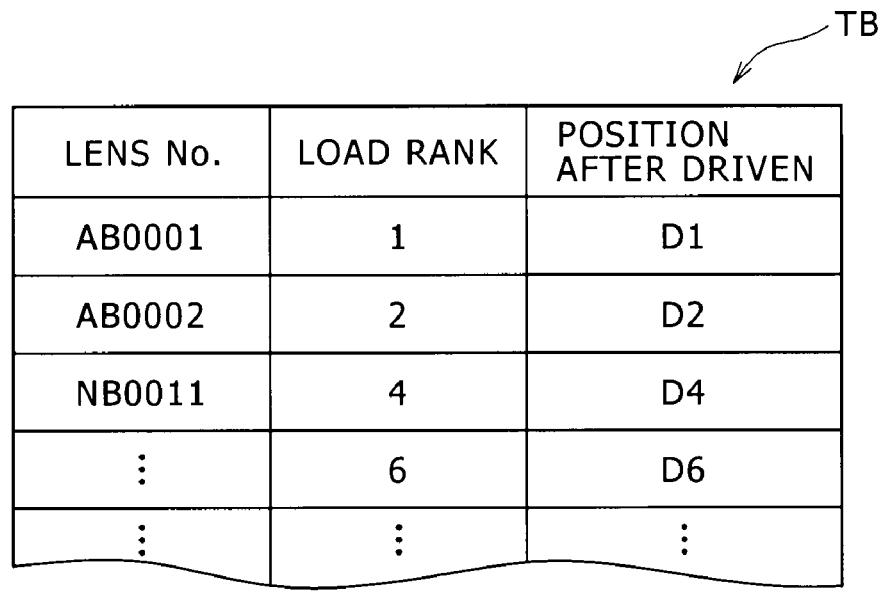
FIG. 11 is a data table for use in determining the lens in the imaging device shown in FIG. 9.

FIG. 11 is a data table TB for use in determining the lens. This data table TB is stored in the ROM of the general control section 101 provided in the camera body 2.

As shown in FIG. 11, the imaging device 1C according to the third preferred embodiment preliminarily defines the magnitude of a load to be applied to the focus lens (load rank) according to a lens number and the position of the second slider 72 according to the load rank. More specifically, the correspondence between a lens number (symbol) "AB0001" and a load rank "1" is preliminarily stored in the data table TB. Further, it is also stored in the data table TB that in the case of the lens number "AB0001" the second slider 72 is to be moved to a position "D1" (see also FIG. 10) by the driving block 75. Similarly, the correspondence between a lens number "NB0011" and a load rank "4" is stored in the data table TB, and a position "D4" of the second slider 72 to be driven by the driving block 75 in this case is also stored in the data table TB. As described above, the position of the first slider 71 can be changed with a change in position of the second slider 72, thereby changing the magnitude of the braking load transmitted from the first slider 71 through the elastic force applying spring 62 and the braking pad 61 to the body-side coupler CP1.

According to this preferred embodiment, a braking force changing according to the kind of the lens mounted on the camera body 2 can be transmitted through the body-side coupler CP1 and the lens-side coupler CP2 to the focus lens. Accordingly, a suitable braking force can be decided according to the kind of the lens.

Figure 12:
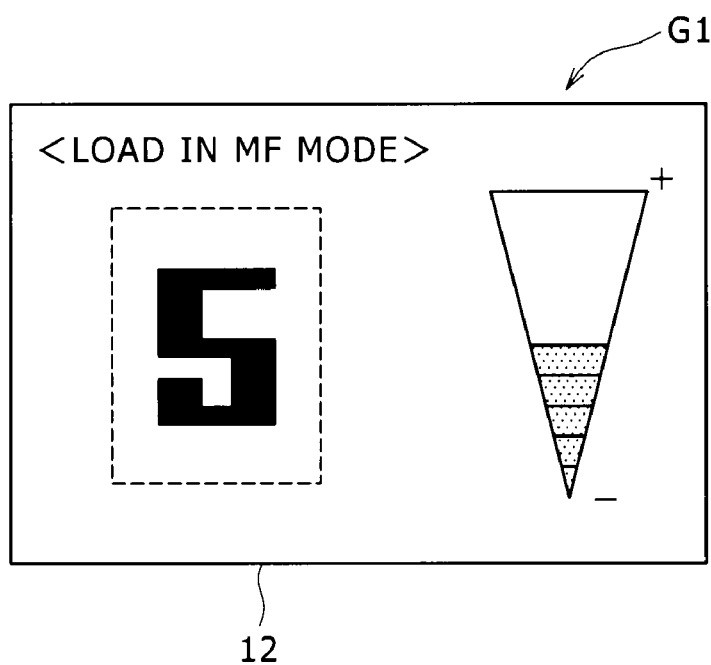
FIG. 12 is a plan view showing a setting change screen.

The magnitude of the braking load can be changed by a setting change operation using the back monitor 12. FIG. 12 is a plan view showing a setting change screen G1 on the back monitor 12. A cross button (more specifically, up button and/or down button) provided on the back side of the imaging device 1C is adapted to be operated by the operator, thereby changing the set value for the magnitude of the load (load rank) in the manual focus operation. According to the set value changed by this setting change operation, the second slider 72 is moved to a suitable position, and the first slider 71 is accordingly moved to a suitable position. Thus, the original set value previously set according to the kind of the lens can be further changed. In other words, the user's preferences can be further reflected on the magnitude of the braking load in rotating the manual focus ring in the manual focus operation.

4. Fourth Preferred Embodiment 4-1. Outline

While no AF drive source is provided in the camera body 2 according to the first to third preferred embodiments mentioned above, the present invention is not limited to such a configuration. That is, the scope of the present invention is also applicable to the case that an AF drive source is provided in the camera body 2. An imaging device 1D according to the fourth preferred embodiment adopts such a configuration that an AF drive source is provided in the camera body 2. The difference between the third preferred embodiment and the fourth preferred embodiment will now be described mainly.

In the case that an AF drive source containing type lens is mounted as the taking lens unit 3 on the camera body 2 in the imaging device 1D, an AF operation can be performed as in each of the above-mentioned preferred embodiments. That is, a control signal from the AF control block 111 is transmitted through the electric contact CT to the lens moving mechanism (not shown) provided in the taking lens unit 3, thereby driving the AF drive source (e.g., AF motor) provided in the taking lens unit 3. In response to this driving operation, the focus lens provided in the taking lens unit 3 is moved to a focusing position, thus realizing a focusing operation.

On the other hand, in the case that an AF drive source uncontaining type lens is mounted as the taking lens unit 3 on the camera body 2 in the imaging device 1D, the AF operation can be performed by using an AF drive source 25 (see FIG. 13) provided in the camera body 2.

Further, in this case that the uncontaining type lens is mounted as the taking lens unit 3 on the camera body 2, a manual focus operation (MF operation) can also be performed by using the load applying section 60 or the like to apply a braking load to the body-side coupler CP1. That is, as in the third preferred embodiment, the braking load in rotating the manual focus ring in the manual focus operation can be adjusted.

When an autofocus mode is changed to a manual focus mode in an existing imaging device including an AF drive source, the connection between the AF drive source and a body-side coupler is canceled. In this case, however, almost no load is applied to a lens-side coupler same as above case. As a result, there is a problem such that the focus lens may be relatively largely moved by applying a very small force in the manual focus operation.

To cope with this problem, the imaging device 1D according to this preferred embodiment includes a drive switching section 80 (described later) for allowing a braking load to be applied from the load applying section 60 to the body-side coupler CP1 in the case of selecting the manual focus operation. Accordingly, the operability in the manual focus operation can be improved.

In the following description, the uncontaining type lens is mounted on the camera body 2 in the imaging device 1D.

In the case that the focus mode of the imaging device 1D is set to an AF mode (autofocus mode), the AF drive source 25 is mechanically connected to the body-side coupler CP1, thereby performing the AF operation using the AF drive source 25. On the other hand, in the case that the focus mode of the imaging device 1D is set to an MF mode (manual focus mode), the drive switching section 80 is operated to switch the connected condition from the AF drive source 25 to the load applying section 60. That is, the load applying section 60 is mechanically connected to the body-side coupler CP1 in the MF mode. Thus, the drive switching section 80 functions to switch between the AF drive source 25 and the load applying section 60 as a member to be connected to the body-side coupler CP1. A switching operation (setting operation) in relation to the focus mode (focus operation), i.e., an operation for selecting one of the AF mode (AF operation) and the MF mode (MF operation) is performed by using an AF/MF switching (selecting) section 88. The AF/MF switching section 88 is provided with a selector switch 88b (see FIG. 14) adapted to be operated by the operator. The selector switch 88b is provided on the front side of the camera body 2 (e.g., in the vicinity of the lens release button 89 shown in FIG. 1).

Figure 13:
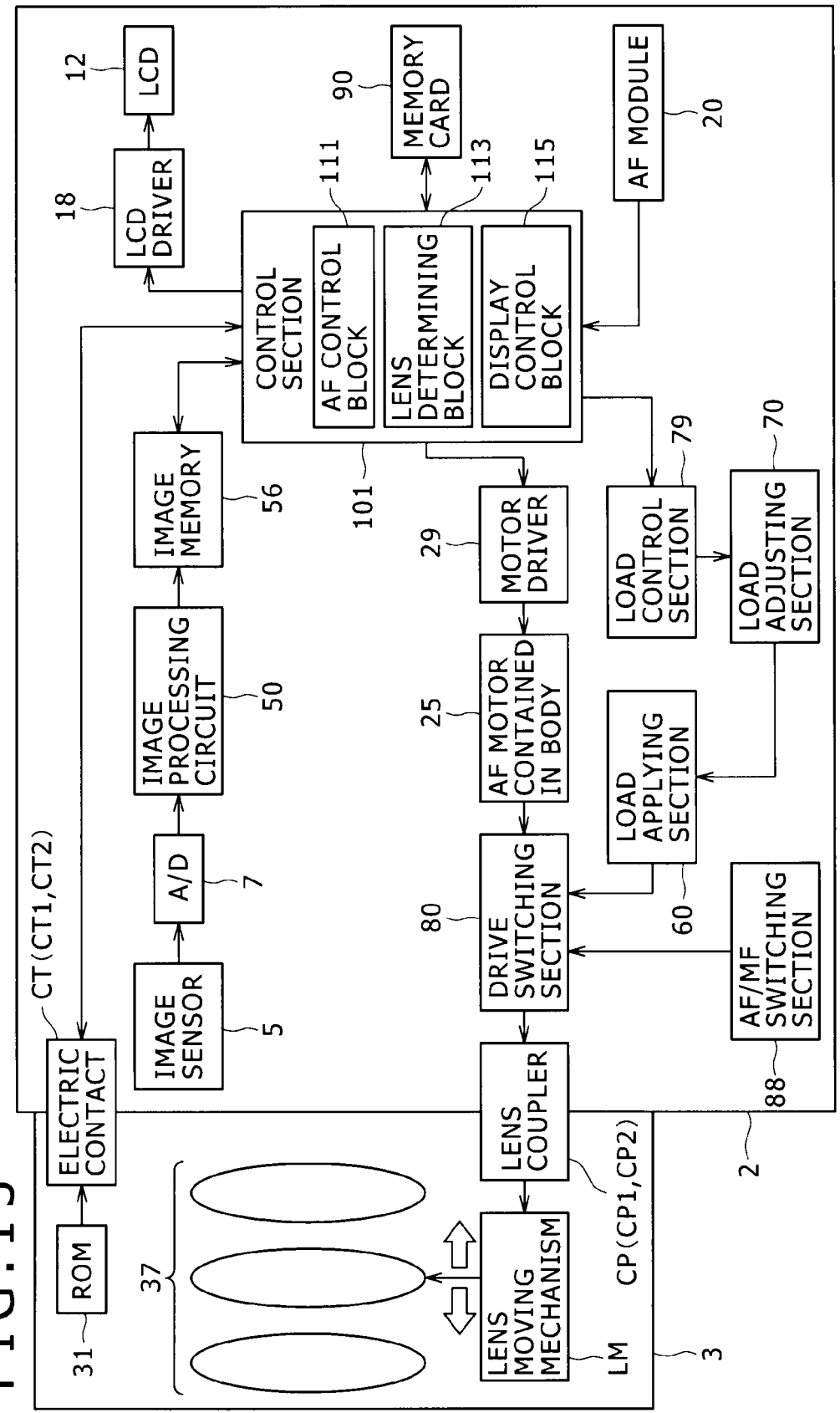
FIG. 13 is a block diagram showing the functional configuration of an imaging device according to a fourth preferred embodiment of the present invention.

FIG. 13 is a block diagram showing the functional configuration of the imaging device 1D according to the fourth preferred embodiment. As shown in FIG. 13, the imaging device 1D further includes the AF drive source (AF motor in the body) 25, motor driver 29, drive switching section 80, and AF/MF switching section 88 in addition to the configuration of the imaging device 1C according to the third preferred embodiment.

Figure 14:
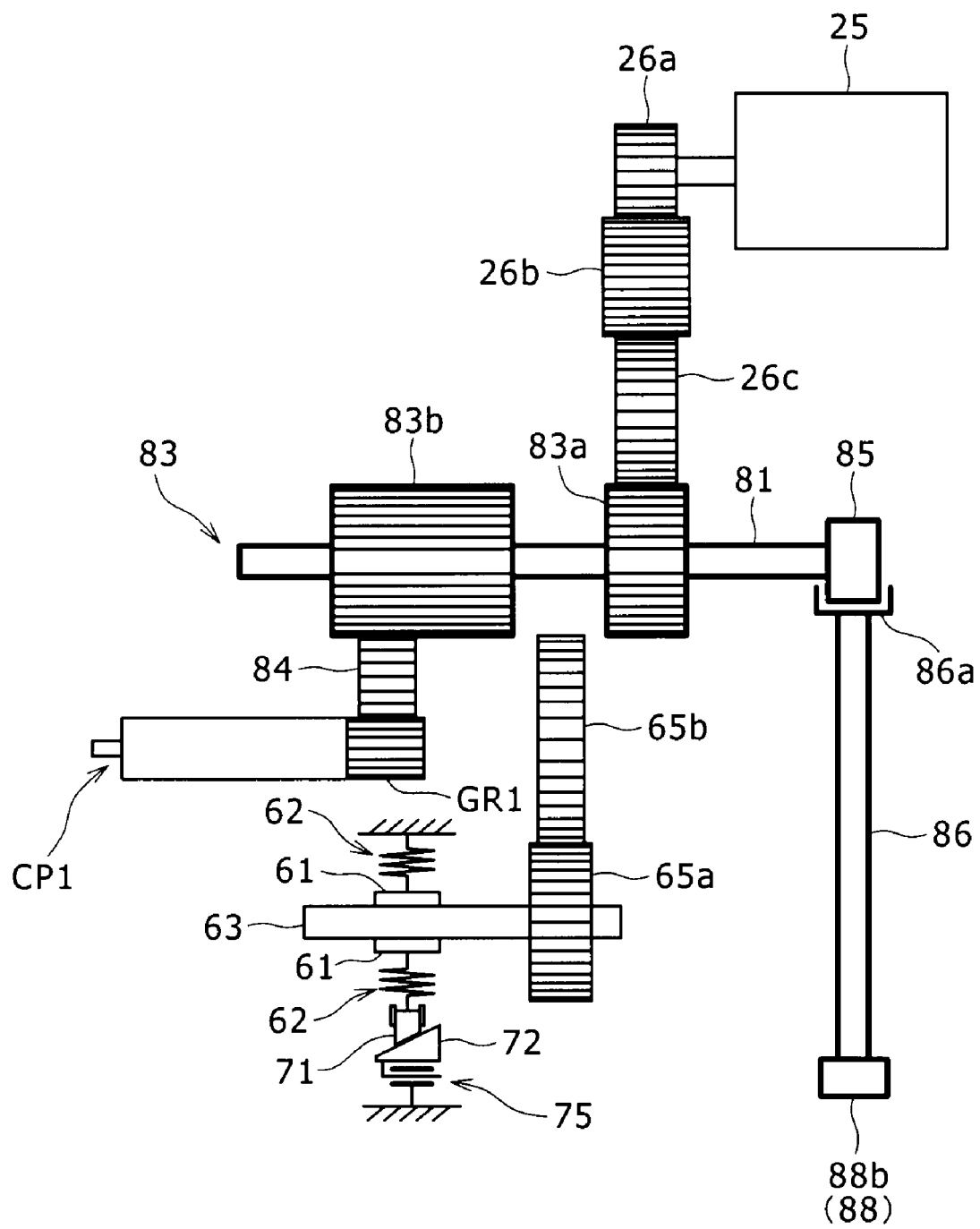
FIG. 14 is a diagrammatic view showing a driving mechanism including a drive switching section in the imaging device shown in FIG. 13.

FIG. 14 is a diagrammatic view showing a driving mechanism including the AF drive source 25, the drive switching section 80, and the AF/MF switching section 88.

As shown in FIG. 14, the drive switching section 80 has a clutch mechanism 83. The clutch mechanism 83 includes a rotating shaft 81, gears 83a and 83b fixed to the rotating shaft 81, and a disk-shaped member 85 fixed to the rotating shaft 81.

The gear 83b is in mesh with an intermediate gear 84. The intermediate gear 84 is in mesh with a gear GR1 formed at the rear end portion (on the back side of the camera, or at the right end portion as viewed in FIG. 14) of the cylindrical body-side coupler CP1. Accordingly, the rotational motion of the rotating shaft 81 of the clutch mechanism 83 is transmitted as the rotational motion of the body-side coupler CP1.

A recessed member 86a is provided at the rear end portion (right end portion as viewed in FIG. 14) of the clutch mechanism 83 so as to surround a part of the outer circumferential portion of the disk-shaped member 85. A connecting member 86 is connected at one end thereof to the recessed member 86a. The connecting member 86 extends substantially perpendicularly to the rotating shaft 81. Further, the selector switch 88b of the AF/MF switching section 88 is connected to the other end of the connecting member 86. The clutch mechanism 83 (more specifically, the rotating shaft 81 and the gears 83a and 83b) is moved laterally in synchronism with the lateral movement of the selector switch 88b as viewed in FIG. 14. According to the moving operation of the selector switch 88b, the clutch mechanism 83 switches between two conditions to be described below.

One of the two conditions corresponds to a condition where the selector switch 88b is set at the position of "AF mode." In this condition, the clutch mechanism 83 is set at its relatively right position (on the back side of the camera) as shown in FIG. 14. In this condition, the gear 83a of the clutch mechanism 83 is connected through gears 26c, 26b, and 26a to a drive shaft of the AF drive source 25. Accordingly, a rotational driving force by the AF drive source 25 is transmitted through the gears 26a, 26b, 26c, 83a, 83b, and 84 to the body-side coupler CP1. This rotational driving force is transmitted from the body-side coupler CP1 to the lens-side coupler CP2, and further transmitted to the focus lens moving mechanism LM provided in the taking lens unit 3. Thus, the rotational driving force of the AF drive source 25 is transmitted to the focus lens moving mechanism LM to move the focus lens in the taking lens unit 3.

In the case that the uncontaining type lens is mounted and the autofocus mode is selected as mentioned above, the rotational driving force by the AF drive source 25 is transmitted through the body-side coupler CP1 and the lens-side coupler CP2 to the focus lens moving mechanism LM in the taking lens unit 3. As a result, the AF operation is realized.

Figure 15:
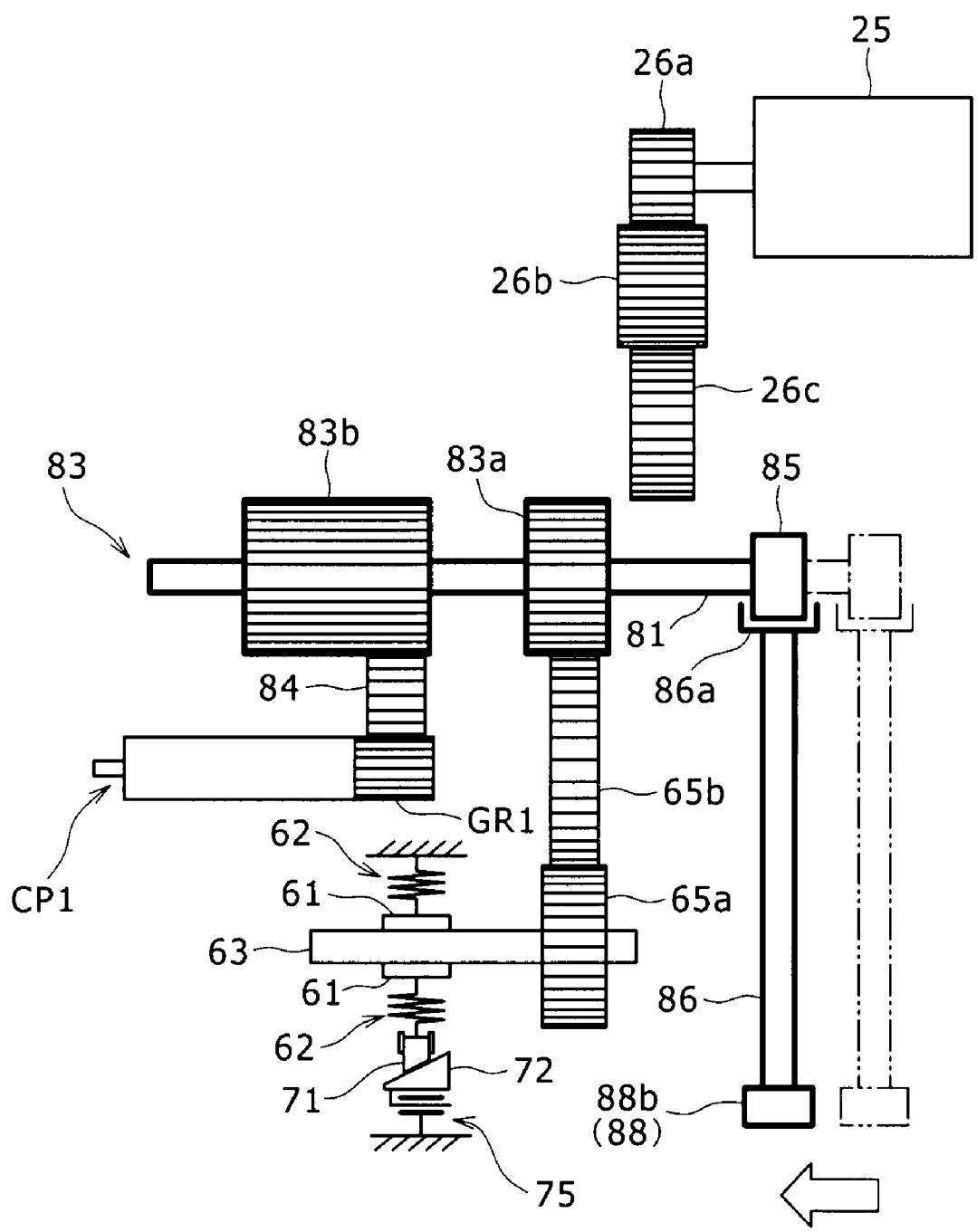
FIG. 15 is a view similar to FIG. 14, showing the operation of a clutch mechanism.

The other condition corresponds to a condition where the selector switch 88b is set at the position of "MF mode." In this condition, the clutch mechanism 83 is set at its relatively left position (on the front side of the camera) as shown in FIG. 15. In this condition, the gear 83c of the clutch mechanism 83 is in mesh with a gear 65b, which is in mesh with a gear 65a. The gear 65a is fixed to a rotating shaft 63. As a result, the rotating shaft 63 is rotated in concert with the rotation of the body-side coupler CP1. Further, a braking load due to a frictional force is applied to the rotating shaft 63. More specifically, as in the third preferred embodiment, the braking load is applied by the braking pads 61 and the elastic force applying springs 62. Accordingly, the braking load applied to the rotating shaft 63 is transmitted through the gears 65a, 65b, 83a, 83b, 84, and GR1 to the body-side coupler CP1. This braking load is transmitted from the body-side coupler CP1 to the lens-side coupler CP2, and further transmitted to the focus lens moving mechanism LM in the taking lens unit 3. This configuration shown in FIG. 15 may be represented as a configuration of indirectly applying a braking load to the body-side coupler CP1 as in FIG. 6.

In the case that the uncontaining type lens is mounted and the manual focus mode is selected as mentioned above, the braking force applied by the braking pads 61 and the springs 62 is transmitted through the rotating shaft 63, the body-side coupler CP1, and the lens-side coupler CP2 to the focus lens moving mechanism LM in the taking lens unit 3.

In the case that the operator rotates the manual focus ring to perform the manual focus operation, the focus lens in the taking lens unit 3 receives a suitable braking force due to the braking load mentioned above. Accordingly, the focus lens in the taking lens unit 3 is moved under a suitable load. As a result, it is possible to avoid the problem that the focus lens may be relatively largely moved by applying a very small force, thereby allowing fine adjustment of the focus lens.

4-2. Operation

The control operation in the imaging device 1D will now be described in more detail.

When the taking lens unit 3 is mounted to the camera body 2 and the power is turned on, the lens determining block 113 obtains the identification information on the taking lens unit 3 mounted on the camera body 2 to determine the kind of the lens mounted. More specifically, it is determined whether the lens mounted is an AF drive source containing type lens or an AF drive source uncontaining type lens.

When the lens mounted is the AF drive source containing type lens and the selector switch 88b of the AF/MF switching section 88 is set at the position of "AF mode", the AF control block 111 transmits a control signal through the electric contact CT, thereby driving the AF drive source provided in the taking lens unit 3. Accordingly, the focus lens in the taking lens unit 3 is moved along its optical axis.

When the lens mounted is the AF drive source uncontaining type lens and the selector switch 88b of the AF/MF switching section 88 is set at the position of "AF mode", the AF control block 111 performs the following operation. That is, the AF control block 111 drives the AF drive source 25 through the motor driver 29, thereby applying a rotational driving force from the AF drive source 25 to the body-side coupler CP1. This rotational driving force is transmitted through the lens-side coupler CP2 connected to the body-side coupler CP1 to the focus lens moving mechanism LM in the taking lens unit 3. Accordingly, the focus lens in the taking lens unit 3 is moved along its optical axis.

When the selector switch 88b of the AF/MF switching section 88 is set at the position of "MF mode", a braking load is applied from the load applying section 60 through the clutch mechanism 83 of the drive switching section 80 to the body-side coupler CP1. In Particular, in the case that the taking lens unit 3 is the uncontaining type lens, the braking load is further transmitted from the body-side coupler CP1 to the lens-side coupler CP2, thereby functioning as a braking force in relation to the movement of the focus lens.

In the case that the taking lens unit 3 is the containing lens type, the operation in the MF mode differs according to whether or not the containing type lens has the lens-side coupler CP2. More specifically, when the containing type lens does not have the lens-side coupler CP2, the load adjusting function mentioned above is not realized, whereas when the containing type lens has the lens-side coupler CP2, the load adjusting function mentioned above is realized.

Thus, the operability in the manual focus operation can also be improved according to this preferred embodiment.

5. Modifications

Various preferred embodiments of the present invention have been described above, it should be noted that the embodiments of the present invention are not limited to the above preferred embodiments.

Figure 16:
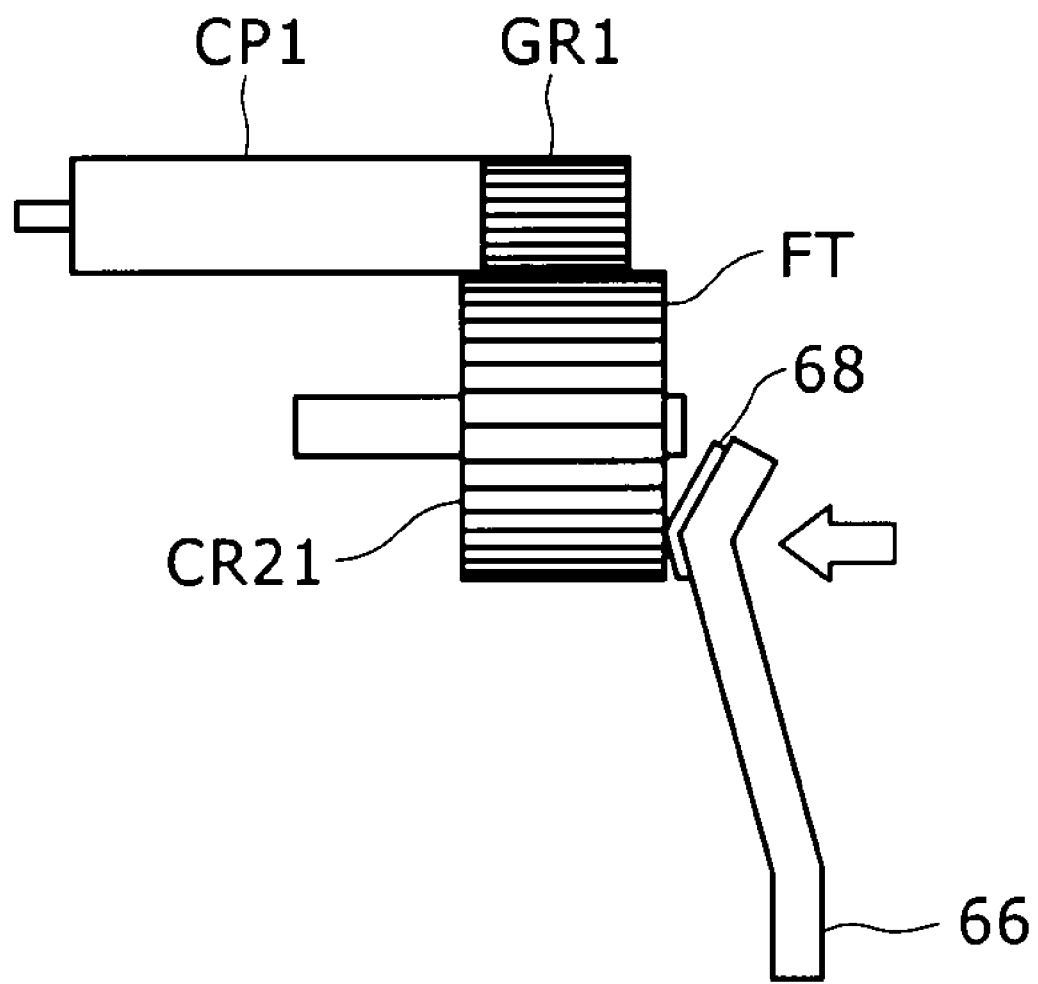
FIG. 16 is a diagrammatic view showing a braking mechanism according to a modification of the present invention.

For example, while the braking pads 61 are pressed on the outer circumferential surface of a rotating member (e.g., the body-side coupler CP1 or the rotating shaft 63) to produce a frictional force for applying a braking load in each preferred embodiment mentioned above, the embodiments of the present invention are not limited to such a configuration. More specifically, as shown in FIG. 16, a gear GR 21 meshing with the gear GR1 formed at the rear end portion of the body-side coupler CP1 may be provided, and a braking pad 68 may be pressed on an end surface FT of the gear GR 21 (the surface perpendicular to the axis of rotation of the gear GR 21). The braking pad 68 is biased by a leaf spring 66 toward the end surface FT of the gear GR 21.

The present application contains subject matter related to that disclosed in Japanese Priority Patent Application JP 2008-158581 filed in the Japan Patent Office on Jun. 18, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An imaging device comprising:
a body portion;
a lens mount portion provided on said body portion for mounting a detachable taking lens;
a body-side coupler provided in said body portion and adapted to be connected to a lens-side coupler of said taking lens in mounting said taking lens to said lens mount portion, said body-side coupler being rotated by the lens-side coupler in concert with a moving operation of a focus lens provided in said taking lens;
a load applying means for applying a braking load to said body-side coupler;
a load adjusting mechanism for changing the magnitude of the braking load applied by said load applying means;
a driving section configured to drive said load adjusting mechanism; and
detecting means for detecting the kind of said taking lens mounted on said lens mount portion,
wherein said load adjusting mechanism changes the magnitude of said braking load according to the kind of said taking lens detected by said detecting means.

2. The imaging device according to claim 1, wherein said load adjusting means comprises
a load adjusting mechanism for changing the magnitude of said braking load by using an operational force applied from an operator.

3. The imaging device according to claim 1, wherein said load applying means comprises
a braking member coming into contact with said body-side coupler to apply a frictional force.

4. The imaging device according to claim 1, wherein said load applying means comprises:
a rotating member adapted to be rotated in concert with the rotation of said body-side coupler; and
a braking member coming into contact with said rotating member to apply a frictional force.

5. An imaging device comprising:
a body portion;
a lens mount portion provided on said body portion for mounting a detachable taking lens;
a body-side coupler provided in said body portion and adapted to be connected to a lens-side coupler of said taking lens in mounting said taking lens to said lens mount portion, said body-side coupler being rotated by the lens-side coupler in concert with a moving operation of a focus lens provided in said taking lens;
a load applying means for applying a braking load to said body-side coupler;
driving means for autofocus provided in said body portion for applying a rotational driving force to said body-side coupler to thereby move said focus lens by means of said lens-side coupler; and
selecting means for selecting one of an autofocus mode and a manual focus mode in relation to a focus operation of said taking lens;
wherein when said autofocus mode is selected, the rotational driving force by said driving means for autofocus is applied to said body-side coupler, whereas when said manual focus mode is selected, the braking load by said load applying means is applied to said body-side coupler;
determining means for determining whether said taking lens is an autofocus drive source containing type lens or an autofocus drive source uncontaining type lens,
wherein when said taking lens is said autofocus drive source uncontaining type lens and said autofocus mode is selected, the rotational driving force by said driving means for autofocus is applied to said body-side coupler, whereas when said taking lens is said autofocus drive source uncontaining type lens and said manual focus mode is selected, the braking load by said load applying means is applied to said body-side coupler.

6. An imaging device comprising:
a body;
a lens mount provided on said body for mounting a detachable taking lens;
a body-side coupler provided in said body and adapted to be connected to a lens-side coupler of said taking lens in mounting said taking lens to said lens mount portion, said body-side coupler being rotated by the lens-side coupler in concert with a moving operation of a focus lens provided in said taking lens; and
a brake for applying a braking load to said body-side coupler;
an autofocus drive motor provided in said body portion for applying a rotational driving force to said body-side coupler to move said focus lens by means of said lens-side coupler;
a clutch for mechanically connecting the body-side coupler to the autofocus drive motor in an autofocus mode or to the load applying means in a manual focus mode.

* * * * *